March 26, 1935.  C. A. MATSON  1,995,936
BRAKE MECHANISM
Filed Jan. 30, 1932  4 Sheets-Sheet 1
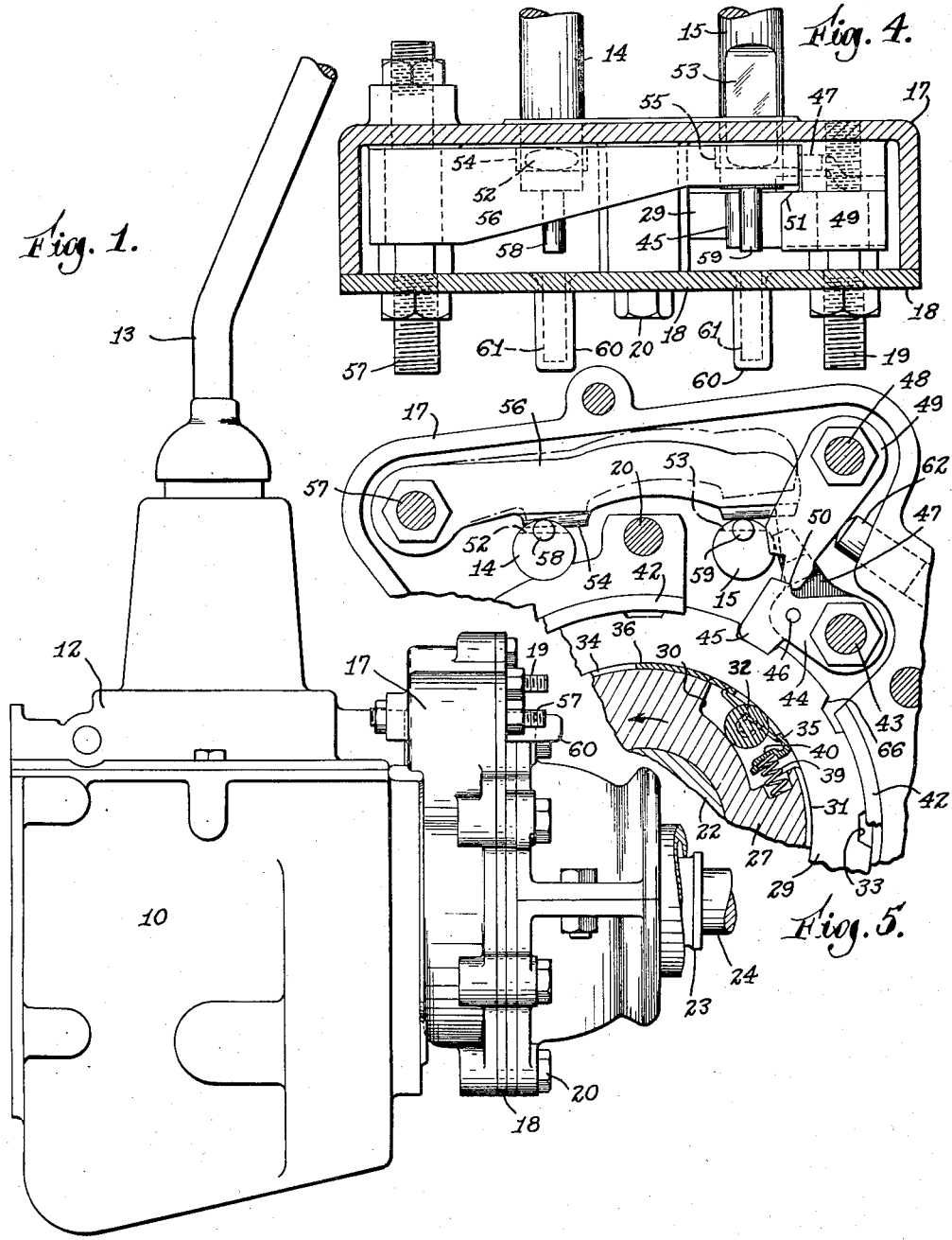
Inventor
Carl A. Matson
by James R. Hodder
Attorney

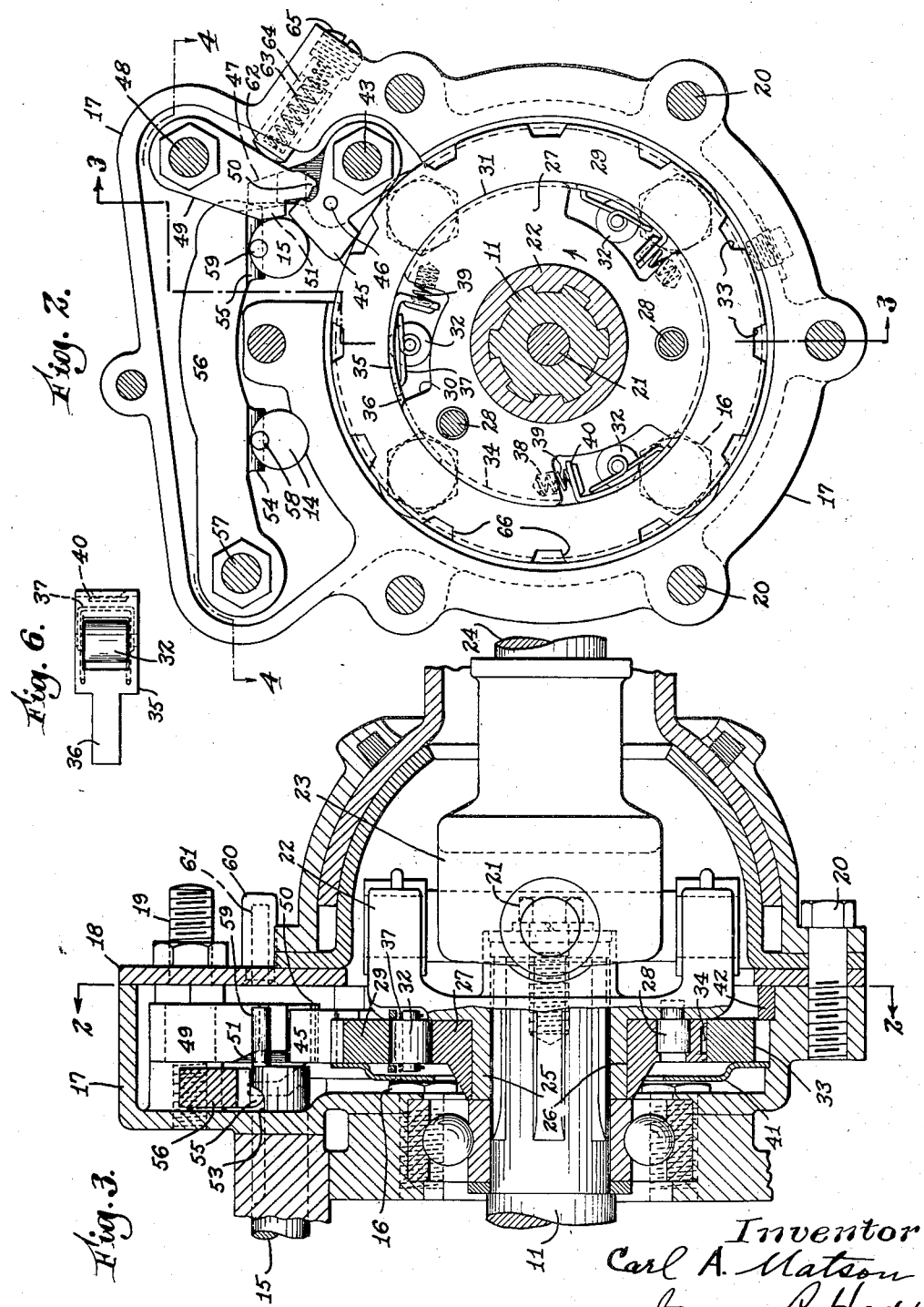

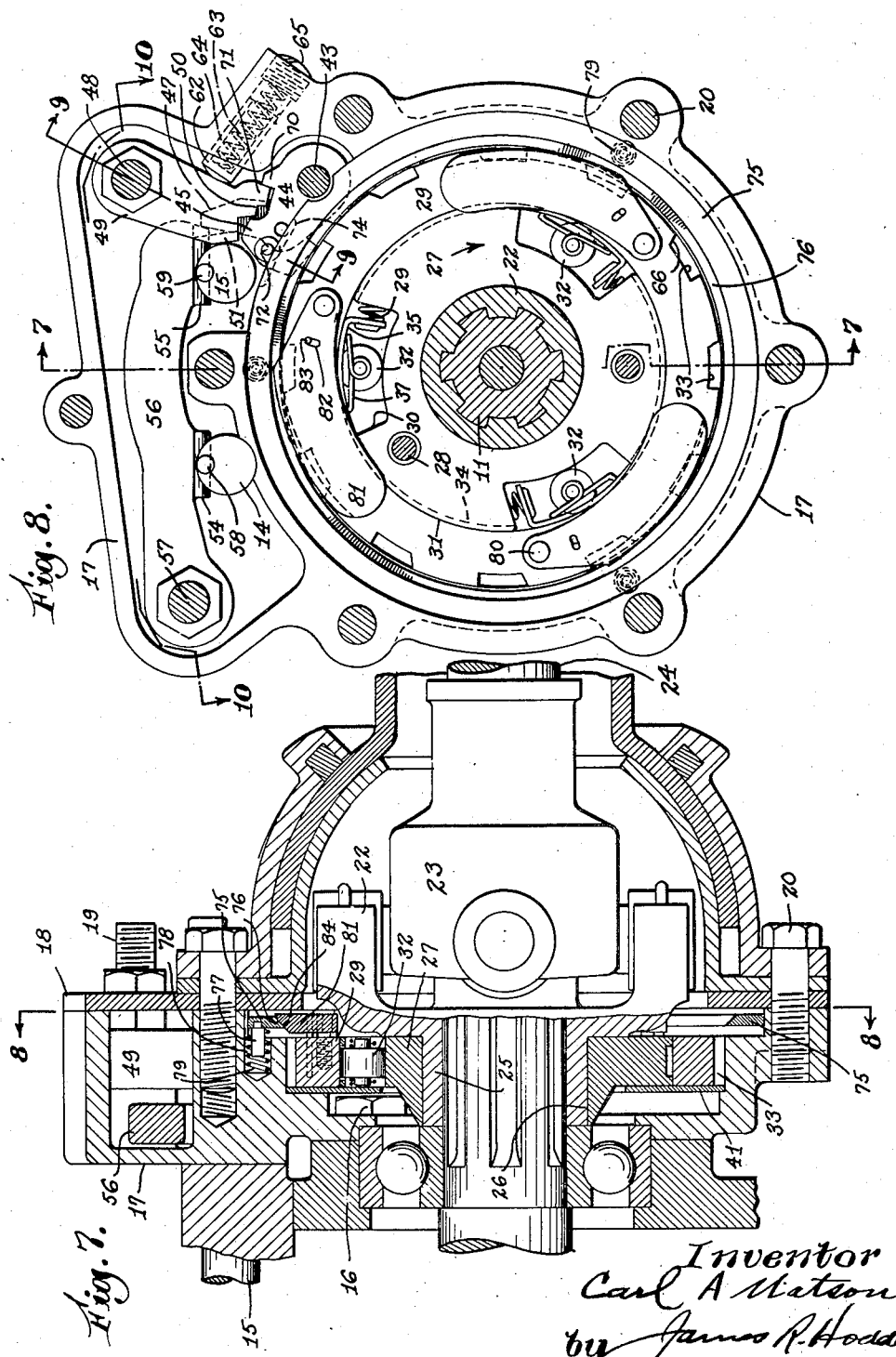

March 26, 1935.  C. A. MATSON  1,995,936
BRAKE MECHANISM
Filed Jan. 30, 1932  4 Sheets-Sheet 4
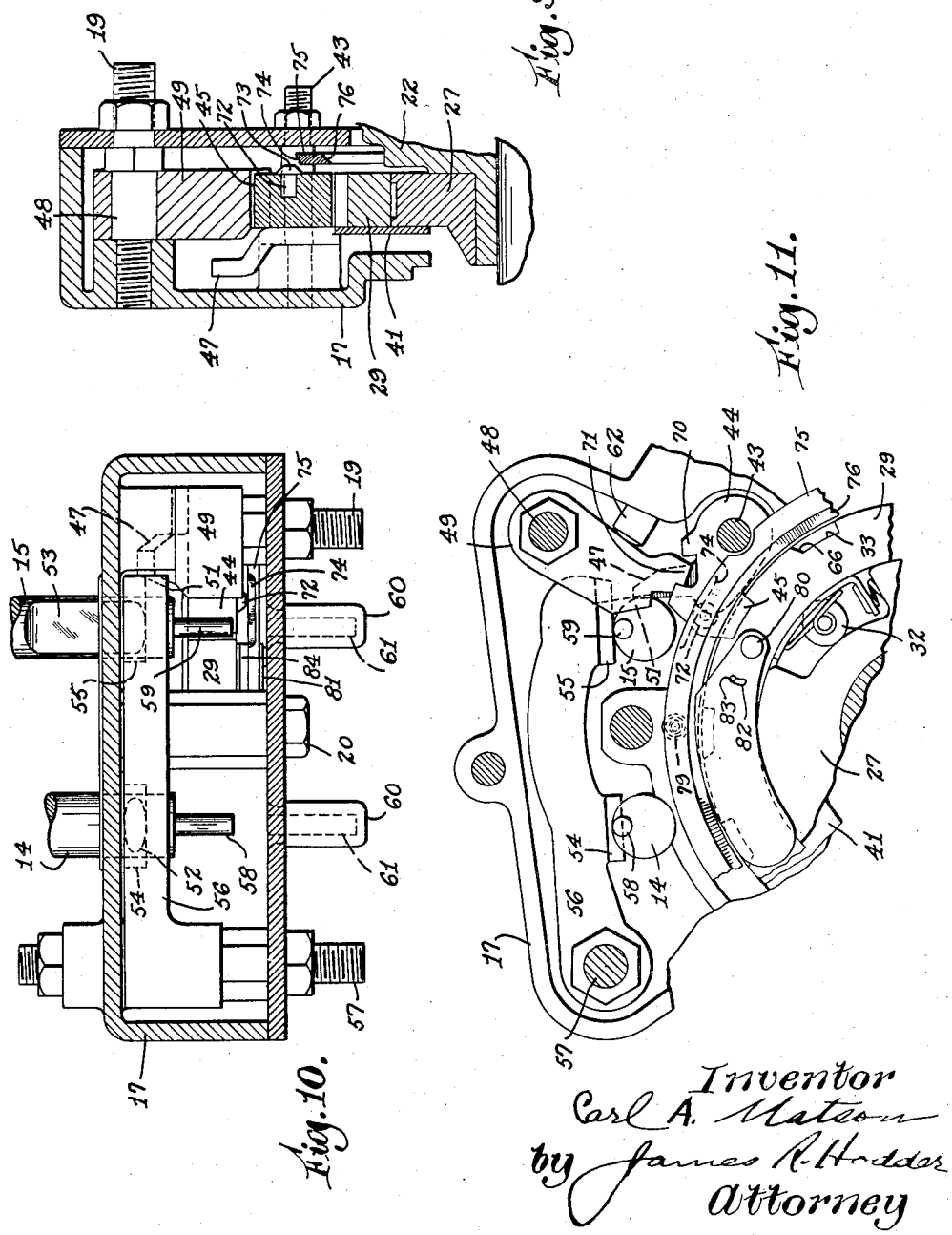

Patented Mar. 26, 1935

1,995,936

UNITED STATES PATENT OFFICE 1,995,936

BRAKE MECHANISM

Carl A. Matson, Lynnfield, Mass., assignor to The Matson Company, Concord, N. H., a corporation of New Hampshire Application January 30, 1932, Serial No. 589,932

16 Claims. (Cl. 192—4)

My present invention relates to a brake mechanism, and more particularly to a novel and improved automatic reverse brake for automobiles or other mechanical devices.

In my development of this art I have devised several distinct mechanisms for accomplishing the desirable purpose of preventing inadvertent retrograde movement of a motor vehicle, particularly on inclines, the device of the instant application pertaining to this generic type of mechanisms.

An important object of the present invention resides in the provision of an automatic reverse brake for motor vehicles or the like which is simple in the extreme to manufacture and install, and is applicable either to existing automobiles, or may be incorporated as a component part thereof during manufacture.

Another feature of my invention resides in the fact that substantially no change or alteration is required when applying my device to an existing machine.

Another object of the present invention resides in the fact that my present device is highly efficient in operation, being positive in use, rugged, durable and long lived while yet possessing the advantages of simplicity and economy.

Another feature of the present invention resides in the fact that a machine equipped with my device may be moved in a rearward direction, either under its own power or by hand, by placing the normally operative reverse brake mechanism in an inoperative condition or position, this being accomplished by simply moving the gear shift lever to reverse position and thence to neutral position.

Another and important feature of the present invention resides in the fact that the locking elements, preferably rollers, are held out of idling engagement during the forward movement of the device. The importance of this feature will be instantly apparent to those skilled in this art, as the elimination of idling of the locking elements during movement of the device in a forward direction results in the elimination of the major portion of the friction and wear which would otherwise be imposed upon these locking elements or devices.

A still further object of the present invention resides in the provision of a novel member which I have herein termed a ratchet ring, as the fixed part of my novel reverse brake mechanism. This ratchet ring is normally restrained from rotation by means of a novel pawl and latch mechanism, which will, of course, be hereinafter more fully described.

Another object of the present invention resides in the provision of means to prevent a too-sudden stoppage of the ratchet ring under certain conditions, such, for example, as when a car is moving rearwardly and the operator shifts the gears to a forward direction. Were it not for the provision of the last mentioned means, this movement of the gear shift lever would result in the instantaneous locking of the ratchet ring and impart a considerable shock to the vehicle. By my invention, however, locking of the ratchet ring is prevented until the speed of travel of the vehicle in a rearward direction has become negligible, so that upon engagement of the cooperating locking elements, there will be no material or apparent shock, thus obviating the likelihood of damage or injury which would be present otherwise.

Other objects and features of the invention reside in the particular construction and arrangement of the device and parts thereof, and all of the foregoing, together with other objects and features of the invention, will be hereinafter more fully pointed out, described and claimed.

Referring to the drawings illustrating a preferred embodiment of the present invention;

Fig. 1 is a side elevation of an automobile transmission mechanism illustrating my invention applied thereto;

Fig. 2 is a vertical sectional view on the line 2—2 of Fig. 3 after the device has been moved to neutral position from reverse;

Fig. 3 is a vertical sectional view on the line 3—3 of Fig. 2;

Fig. 4 is a plan sectional view on the line 4—4 of Fig. 2;

Fig. 5 is a fragmentary vertical sectional view similar to Fig. 2 but with the parts in the position assumed during any forward speed;

Fig. 6 is a plan view of one of the locking rolls and its cooperating shoe;

Fig. 7 is a vertical sectional view on the line 7—7 of Fig. 8, illustrating additional novel features;

Fig. 8 is a vertical sectional view on the line 8—8 of Fig. 7, with the device in neutral position after being in reverse, or while the device is in reverse position;

Fig. 9 is a fragmentary cross sectional detail on the line 9—9 of Fig. 8;

Fig. 10 is a plan sectional view on the line 10—10 of Fig. 8; and

Fig. 11 is a fragmentary view similar to Fig. 8 with the device in the position assumed during any forward speed.

Referring now to the drawings, for a particular description of the invention, its construction, assembly and operation, 10 designates a transmission casing provided with the usual transmission gearing and having rotatably mounted therein and extending through the rear end thereof a transmission shaft 11. Mounted on the top of the transmission casing 10 is a cover 12, in which is pivotally mounted the gear shift lever 13 for operating the slide rods 14 and 15 associated with the speed change gearing within the casing 10. Attached to the rear of the transmission casing 10 by bolts 16 is a casing 17 open at the rear end and provided with a cover 18 that is secured in position by bolts 19 and 20.

Secured to the splined end of the transmission shaft 11 by a bolt 21 is one member 22 of the usual knuckle joint, the other member 23 being connected to the propeller shaft 24. The hub 25 of the member 22 is smoothed off, to provide a seat 26 for a disc 27, said disc 27 being pinned to the member 22 by the pins 28. Surrounding the disc 27 and having a substantially close fit otherwise, although there is a running clearance therebetween, is a member 29, which I have herein referred to, for simplicity, as a ratchet ring, because of the fact that this ring is provided, on its outer periphery, with a plurality of spaced notches 33. Symmetrically arranged about the periphery of the disc 27 are recesses 30, said recesses forming, with the bore 31 of the ring 29, substantially wedge-shaped or tapered chambers, in each of which is rotatably mounted a roller 32.

The disc 27 is provided with an annular circumferential groove 34 communicating with the recesses 30. In each recess 30 is also mounted a shoe 35 having a tongue 36 seated in the groove 34, said shoe and tongue being slidable in said recess and groove.

Each roll 32 is carried by a U-shaped spring 37, the ends of said U-shaped spring being fixed to the shoe 35 and the tendency of said spring being to force the roller 32 away from the bore 31 of the ring 29. Associated with each recess 30 is a smaller recess 38 within which is seated a coiled spring 39 butting against the flange 40 of the shoe 35, and normally tending to move said shoes, as well as the rollers carried thereby, toward the small end of the wedge-shaped chambers 30.

Lateral displacement of the rollers 32 and shoes 35 is prevented by means of a plate 41, said plate, as well as the disc 27, being held in position by a split ring 42 which extends but partially therearound, as clearly illustrated in Fig. 5.

Pivoted at 43 is a lever 44 having thereon a pawl 45 and pinned to the lever 44 at 46 and therefore operable therewith is a dog 47. Locked above the pivot 43 is a second pivot 48 on which is mounted a lever 49 having a latch 50, and also being provided with a cam surface 51. The slide rod 14 is provided with a short cam groove 52, and the slide rod 15 is provided with an elongated cam groove 53, in which rest the depending cams 54 and 55 respectively on the arm 56, which is pivoted in the casing 17 at 57. The slide rods 14 and 15 are also provided with rearwardly extending rods 58 and 59 respectively, the upper edges of said rods being flush with the upper edges of the slide rods.

Fixed to the cover plate 18 is a pair of housing members 60 provided with recesses 61 to accommodate the extension pins 58 and 59 when required.

Assuming the device to have been constructed and arranged as above described, with the parts in the position in Fig. 5, and with the transmission shaft 11 and disc 27 rotating in a counter-clockwise direction, as illustrated by the arrow in Fig. 5, in order to cause forward movement of the vehicle to which the device is assumed to be attached, such forward movement will be effected independently of the ratchet ring 29, one of the notches 33 of said ring being engaged by the pawl 45, and said pawl in turn being engaged by the latch end 50 of the lever 49, said lever being forced to the position illustrated in Fig. 5 by the plunger 62 controlled by the spring 63 confined in the recess 64 between the plunger 62 and the screw plug 65. Such counter-clockwise movement or rotation of the disc 27 will tend to force the rollers 32 to the right, as viewed in Figs. 2 and 5, or toward the large end of the wedging chambers 30, against the tension of the springs 39. The tension of said springs 39 is not sufficient to prevent this tendency on the part of the rollers 32. Immediately on the rollers 32 reaching a point in the chambers 30 of greater diameter than the diameter of the rollers 32, the springs 37 will force said rollers downwardly away from the bore 31, thus entirely eliminating idling contact of the rollers 32 with the bore 31 during forward movement of the device. This elimination of idling engagement on the part of the rollers 32 removes the greatest factor of wear therefrom, thus increasing and prolonging the life of the device to a great extent.

Now assume that with the device in the position illustrated in Fig. 5, the machine in which it is incorporated is stopped on an incline. Immediately upon stopping, there would tend to be a retrograde movement of the vehicle, turning the shaft 11 and disc 27 in a clockwise direction. However, the ratchet ring 29 being held against movement, the springs 39, together with the clockwise movement of the disc 27, will force the rollers 32 toward the small end of their respective chambers, wedging said rollers between the inner wall of said chamber and the bore 31 of the ring 29, effectually preventing any inadvertent reverse movement of the vehicle.

Now assume that it is desired to move the device in a reverse direction, such as by motion under the vehicle's own power. The gear shift lever 13 is manipulated to reverse position, which movement will cause a movement of the slide rod 15 to the rear, and an engagement of the edge of said rod with the cam face 51 of the lever 49, moving said lever about its pivot 48 in a counter-clockwise movement, against the tension of the spring pressed plunger 62, which movement will free the latch 50 from the pawl 45. Thereupon, movement of the shaft 11 and disc 27 in a clockwise direction will also tend to move the ring 29, and when this movement occurs, the cam face 66 of the particular notch 33 in engagement with the pawl 45 will force said pawl out of said notch, to the position illustrated in Fig. 2. This will permit reverse movement of the device, as will be readily appreciated. Upon such movement taking place, when the pawl 45 is displaced from its notch 33, the dog 47 will ride on the under side of the arm 56, until the dog 47 has passed beyond the outer end thereof, whereupon said lever 56 will drop to normal position and be engaged by the dog 47, as illustrated in Fig. 2, holding the pawl 45 out of engagement with the ring 29. Thus, when the gear shift lever 13 is moved from reverse position to neutral, the device will remain in the position illustrated in Fig. 2. The elongated slot 53 permits movement of the slide rod 15 to the rear without effecting any vertical movement of the lever 56, as will be appreciated.

Now assume that the device is in neutral, as illustrated in Fig. 2, and that it is desired to move to a forward speed. On movement of the gear shift lever 13 into first or low gear, the slide rod 15 will be moved forwardly, and the depending cam 55 will be engaged by the rearmost wall of the elongated cam groove 53, raising the lever 56 to the position illustrated in full lines in Fig. 5. This permits the plunger 62 to force the lever 49 in a clockwise rotative movement, the pawl 45 and dog 47 falling to a position against the outer periphery of the ring 29. If at this instant, the pawl 45 is in register with one of the notches 33, it will engage said notch and the latch 50 will engage said pawl to hold the same therein. If, however, the pawl 45 is not in register with a notch 33, upon the slightest retrograde movement of the vehicle, the ring 29 will be rotated in a clockwise direction, and as soon as the next succeeding notch registers with the pawl 45, engagement thereof will take place and further retrograde movement be restrained. With the slide rod 15 moved forwardly, the lever 56 will then ride upon the extension pin 59, as will be readily understood. Upon movement of the gear shift lever 13 from low or first gear to either of the other forward speeds, the depending cam 54 will be raised out of the cam groove 52, regardless of the direction of movement of the slide rod 14, to the position illustrated in dotted lines in Fig. 5, without effecting the relation of the pawl 45 and ratchet ring 29. Thus the device, in any of the forward speeds, is constantly in operative position, it being necessary to move the gear shift lever 13 to reverse position in order to render the braking device inoperative.

It will be appreciated that when the gear shift lever 13 is being moved from the neutral, with the device in the position illustrated in Fig. 2, that the initiation of movement toward a forward speed will place the device in operative position, without any time interval being required to effect this result. On any movement of the extension pins 58 or 59 to the rear, the same will be accommodated by and housed in the members 60.

In order to eliminate the necessity of first moving the gear shift lever into or toward reverse position, and then returning the same to neutral before the vehicle can be moved forwardly or backwardly, as, for example, on the floor of a garage, I provide, on the lever 44, a lug 70 in register with a lug 71 on the lever 49. Thus, when the rod 15 is moved rearwardly, as will be the case when the gear shift lever 13 is moved toward reverse position, the edge of said rod, engaging the cam face 51 on the lever 49, will swing said lever 49 about its pivot 48, bringing the lug 71 into engagement with the lug 60 and rocking the lever 44 about its pivot 43 until the latch 45 is raised from its cooperating notch 33 in the ratchet ring 29. This movement, of course, will be against the pressure of the spring pressed plunger 62, and as the lever 44 is rocked in a clockwise direction, the dog 47 carried thereby will raise the lever 56 until said dog is free of said lever, whereupon said lever will drop to its normal position, as clearly illustrated in Fig. 8. Thereupon, whether the gear shift rod 15 is retained in the position illustrated in Fig. 8, or whether it is returned to neutral position, the latch 45 will be held out of engagement with the ratchet ring 29 by means of the dog 47 bearing against the outer end of the lever 56. It will thus be appreciated that the lugs 70 and 71 afford means to positively disengage the locking elements comprising the latch 45 and the notches 33, rather than relying upon the camming actions of the cam faces 66 on reverse rotation of the ring 29, a feature that will be instantly apparent to and understood by those skilled in this art.

This feature also eliminates difficulties which might possibly arise when relying upon the camming action to disengage the latch 45. For example, if the gears should not be exactly in register, it would frequently be difficult to effect rearward movement of the vehicle in order to exert such camming action. The novel feature just above described, however, entirely obviates and eliminates this difficulty.

Furthermore, under some circumstances, such, for example, as when a vehicle is rolling rearwardly, and the operator moves the gear shift lever to one of the forward speeds during such rearward movement, damage, injury, and considerable shock are likely to be caused by the instantaneous meshing or engagement of the latch 45 with one of the notches 33 as the ring 29 is rotating in its reverse direction. In order to obviate this difficulty, I provide, on the lever 44, a pin 72 having an inclined or tapered head 73 in lateral register with the wedge face or portion 74 of a ring 75, said ring having a tapered bore or inner edge 76, said ring 75 having fixed thereto, at predetermined intervals, pins 77 which project into recesses 78 in the casing 17.

A coiled spring 79 is seated in each of these recesses, and bears against the ring 75, normally forcing same outwardly away from the lever 44. Pivoted on the pins 80, on the ring 29, are a plurality of brake shoes 81 each provided with a slot 82 engaged by a pin 83 on said ring 29, the function of said slots and pins being to limit the rocking movement of the shoes 81 about their pivots 80. Each shoe 81 is provided with a beveled face 84 in register with the beveled bore 76 of the ring 75.

Now, assuming the device to be in the position illustrated in Fig. 8, and that retrograde movement of the vehicle is initiated. This will cause a rotation of the shaft 11, disc 27 and ratchet ring 29 in the direction of the arrow in Fig. 8, the rotation of the ring 29 being effected by the wedging action of the rolls 32. This rotation of the ring 29, and the centrifugal force exerted thereby against the shoes 81 will throw said shoes outwardly on their pivots 80, forcing the beveled edges 84 against the tapered bore 76 of the ring 75, and camming said ring inwardly against the compression of the springs 79. This will bring the wedge-shaped portion 74 of said ring in vertical as well as lateral alinement with the tapered head 73 of the pin 72, thus holding the latch 45 upwardly out of engagement with the notches 33 of the ring 29. Now, during such reverse movement of the vehicle, if the operator is desirous of initiating forward movement of said vehicle, and moves the gear shift lever to one of the forward speeds, thus raising the lever 56 and freeing the dog 47, said dog and the latch 45 will be restrained from dropping by the construction and action just above described.

However, when the speed of reverse movement of the vehicle has slowed to such an extent that the compression of the springs 79 will overcome the centrifugal force of the shoes 81, then the ring 75 will be moved outwardly from the latch 45 by said springs, thus freeing the pin 72 from the wedge-shaped portion 74 and permitting said latch to drop and engage the next succeeding notch 33 to be brought into register therewith. By this time, however, the speed of rearward movement of the vehicle will be negligible, and thus the engagement of said latch with its cooperating notch in the ring 29 will be effected without material shock or jar, and with no damage or injury to the parts of the device.

As above explained, the said latch 45 will remain in the notch engaged thereby until the gear shift lever 13 is again moved toward reverse position.

It will thus be appreciated that I have devised a simple, serviceable, and efficient automatically operable reverse brake mechanism, and since I believe that the same is novel, I have claimed said device broadly in this application.

My invention is further described and defined in the form of claims as follows:

1. In a device of the kind described, the combination of a driven member, means for applying power thereto to rotate the same in either direction, a locking element carried by said driven member, an abutment surrounding said driven member and cooperating with said locking element to prevent rotation of the driven member in a reverse direction, and means to hold said locking element out of engagement with the abutment on rotation of the driven member in a forward direction.

2. In a device of the kind described, the combination of a driven member, means for applying power thereto to rotate the same in either direction, a locking element carried by said driven member, an abutment surrounding said driven member and cooperating with said locking element to prevent rotation of the driven member in a reverse direction, and resilient means to hold said locking element out of engagement with the abutment on rotation of the driven member in a forward direction.

3. In a device of the kind described, the combination of a driven member, means for applying power thereto to rotate the same in either direction, a locking element carried by said driven member, an abutment surrounding said driven member and cooperating with said locking element to prevent rotation of the driven member in a reverse direction, and automatically controlled means to hold said locking element out of engagement with the abutment on rotation of the driven member in a forward direction.

4. In a device of the kind described, the combination of a driven member, means for applying power thereto to rotate the same in either direction, a locking element carried by said driven member, a ratchet ring surrounding said driven member and cooperating with said locking element to prevent rotation of the driven member in a reverse direction, and means to hold said locking element out of engagement with the ratchet ring on rotation of the driven member in a forward direction.

5. In a device of the kind described, the combination of a driven member, means for applying power thereto to rotate the same in either direction, a locking element carried by said driven member, a ratchet ring surrounding said driven member and cooperating with said locking element to prevent rotation of the driven member in a reverse direction, means to hold said locking element out of engagement with the ratchet ring on rotation of the driven member in a forward direction, and means to normally prevent rotative movement of said ratchet ring.

6. In a device of the kind described, the combination of a driven member, means for applying power thereto to rotate the same in either direction, a locking element carried by said driven member, a ratchet ring surrounding said driven member and cooperating with said locking element to prevent rotation of the driven member in a reverse direction, means to hold said locking element out of engagement with the ratchet ring on rotation of the driven member in a forward direction, and spring controlled means to normally prevent rotative movement of said ratchet ring.

7. In a device of the kind described, the combination with a transmission gearing, including a transmission shaft, of a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, and means automatically controlled by a transmission push rod to permit return of said pawl to locking position.

8. In a device of the kind described, the combination with a transmission gearing, including a transmission shaft, of a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, means automatically controlled by a transmission push rod to permit return of said pawl to locking position, and means to prevent return of said pawl to locking engagement with said ratchet ring during reverse movement of said device, until a predetermined instant.

9. In a device of the kind described, the combination with a transmission gearing, including a transmission shaft, of a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, means automatically controlled by a transmission push rod to permit return of said pawl to locking position, and means controlled by centrifugal force to prevent return of said pawl to locking engagement with said ratchet ring during reverse movement of said device, until a predetermined instant.

10. In a device of the kind described, the combination of a driven member, means for applying power thereto to rotate the same in either direction, said driven member having a wedge-shaped recess therein, a shoe slidable in said recess, a locking roller carried by said shoe, a ratchet ring surrounding said driven member and cooperating with said locking roll to prevent rotation of the driven member in a reverse direction, and resilient means to hold said locking roll out of engagement with the ratchet ring on rotation of the driven member in a forward direction.

11. In a device of the kind described, the combination with a transmission gearing, including a transmission shaft, of a casing, a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, means automatically controlled by a transmission push rod to permit return of said pawl to locking position, a ring resiliently mounted on said casing, and means automatically actuated during reverse movement of said device to move said ring into engagement with said pawl to prevent return of said pawl to locking engagement with said ratchet ring until a predetermined instant.

12. In a device of the kind described, the combination with a transmission gearing, including a transmission shaft, of a casing, a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, means automatically controlled by a transmission push rod to permit return of said pawl to locking position, a ring resiliently mounted on said casing, and means automatically actuated by centrifugal force during reverse movement of said device to move said ring into engagement with said pawl to prevent return of said pawl to locking engagement with said ratchet ring until a predetermined instant.

13. In a device of the kind described, the combination with a transmission gearing, including a transmission shaft, of a casing, a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, means automatically controlled by a transmission push rod to permit return of said pawl to locking position, a ring resiliently mounted on said casing, a plurality of brake shoes pivotally mounted on said ratchet ring and operable by centrifugal force during reverse movement of said device to move said ring into engagement with said pawl to prevent return of said pawl to locking engagement with said ratchet ring, until a predetermined instant.

14. In a device of the kind described, the combination with a transmission gearing, including a transmission shaft, of a casing, a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, means automatically controlled by a transmission push rod to permit return of said pawl to locking position, a ring resiliently mounted on said casing, a plurality of brake shoes pivotally mounted on said ratchet ring and operable by centrifugal force during reverse movement of said device to move said ring into engagement with said pawl to prevent return of said pawl to locking engagement with said ratchet ring, until a predetermined instant, said ring and said brake shoes having cooperating cam surfaces to effect said movement.

15. In a device of the kind described, the combination with a transmission gearing, including a transmission shaft, of a casing, a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, means automatically controlled by a transmission push rod to permit return of said pawl to locking position, a ring resiliently mounted on said casing, a plurality of brake shoes pivotally mounted on said ratchet ring and operable by centrifugal force during reverse movement of said device to move said ring into engagement with said pawl to prevent return of said pawl to locking engagement with said ratchet ring, until a predetermined instant, said ring and said brake shoes having cooperating cam surfaces to effect said movement, and means to limit the rocking movement of said brake shoes in each direction.

16. In a device of the kind described, the combination with a transmission gearing, including a transmission shaft, of a casing, a driven member carried by said shaft, a locking element carried by said driven member, a ratchet ring surrounding said driven member and cooperating with said locking element to prevent rotation of the driven member in a reverse direction, a pawl normally engaging said ratchet ring to prevent rotative movement of said ratchet ring, spring controlled means to hold said pawl in locking position, means automatically operated by a transmission push rod when moved toward reverse gear to move said pawl out of locking engagement, means automatically controlled by a transmission push rod to permit return of said pawl to locking position, a ring resiliently mounted on said casing, a tapered pin on said pawl, said resiliently mounted ring having a wedge-shaped portion in register with said pin, a plurality of brake shoes pivotally mounted on said ratchet ring and operable by centrifugal force during reverse movement of said device to move said ring with the wedge-shaped portion thereof in engagement with the tapered pin on said pawl to prevent return of said pawl to locking engagement with said ratchet ring, until a predetermined instant, said ring and said brake shoes having cooperating cam surfaces to effect said movement, and means to limit the rocking movement of said brake shoes in each direction.

CARL A. MATSON.